Figures 8, 9, 10:
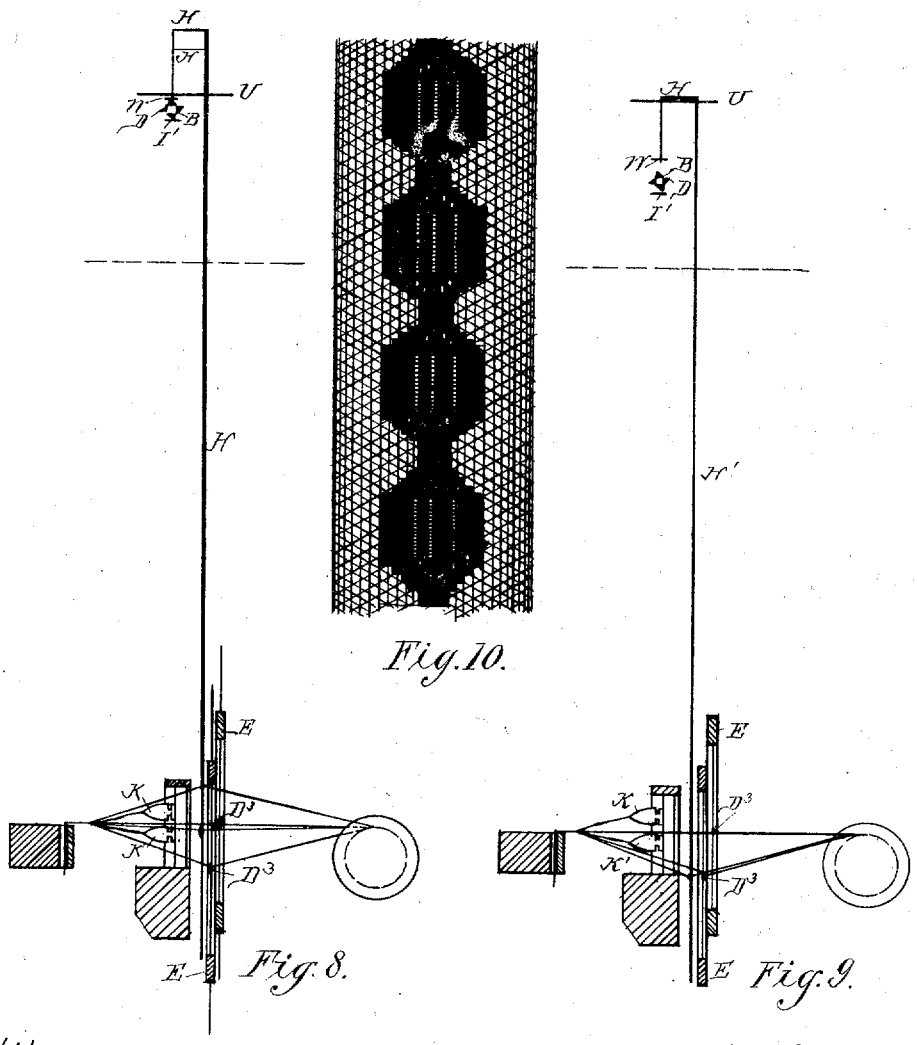

3 Sheets—Sheet 1.
J. O. FRYER.
JACQUARD LOOM.
No. 10,379. Reissued Sept. 11, 1883.
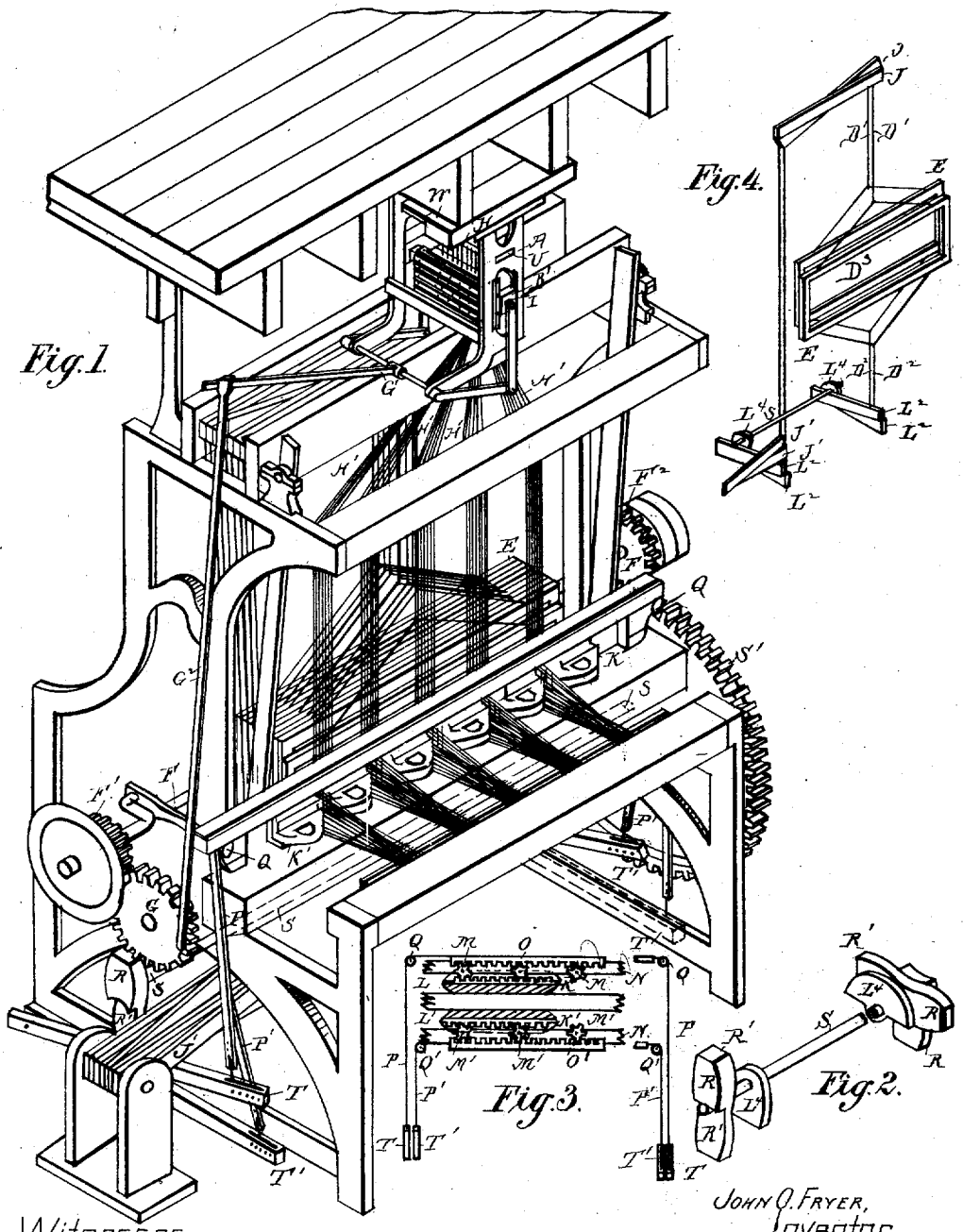
Witnesses,
Wm. S. Dellaway
H. A. Clifford
John O. Fryer,
Inventor,
per Brown Bros.
Attorneys 3 Sheets—Sheet 2.
J. O. FRYER.
JACQUARD LOOM.
No. 10,379. Reissued Sept. 11, 1883.
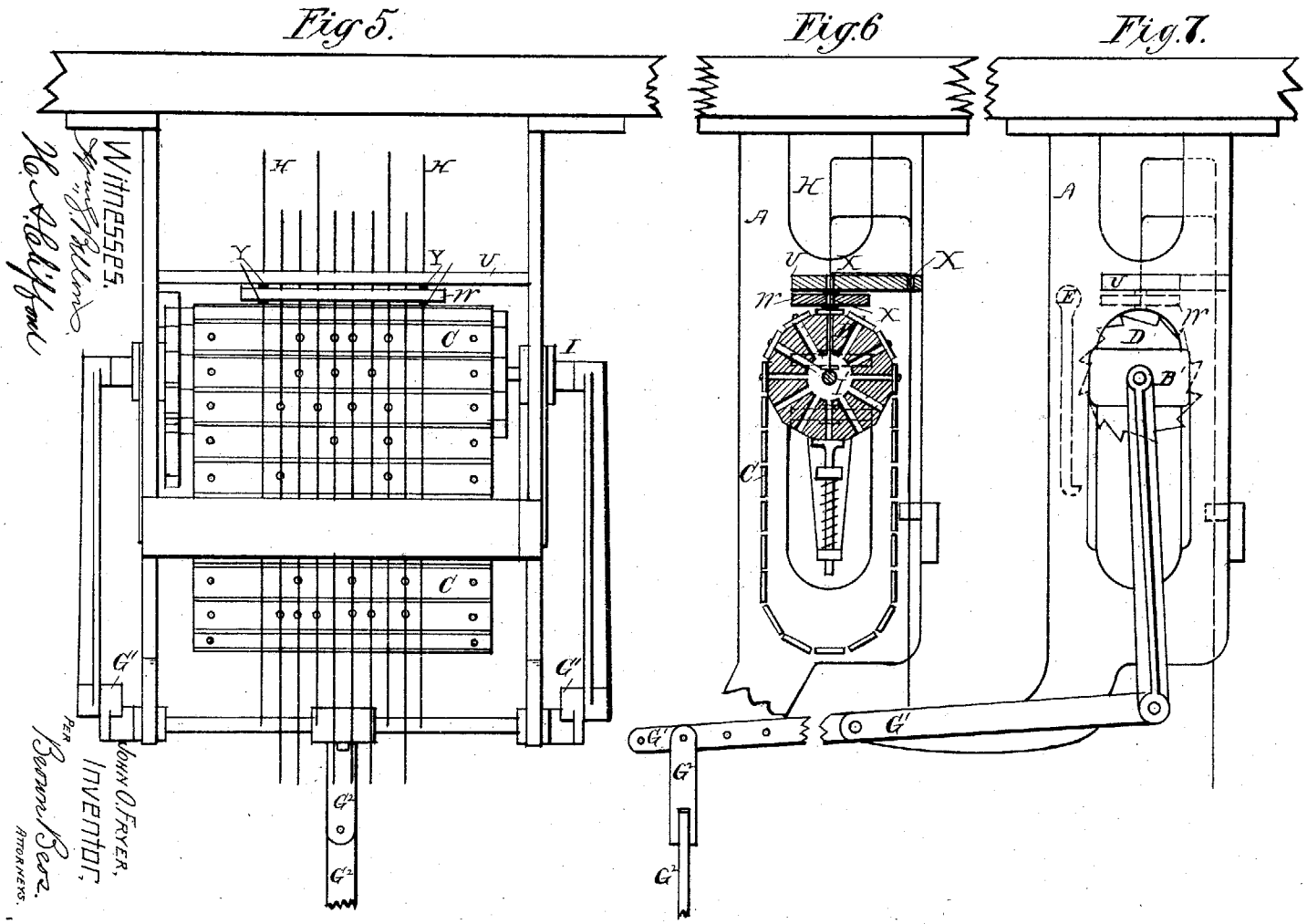

3 Sheets—Sheet 3.

J. O. FRYER.

JACQUARD LOOM.

No. 10,379. Reissued Sept. 11, 1883.

Witnesses.

Wm. S. Bellows

He. A. Clifford

JOHN O. FRYER,
Inventor.

PER Brown & Bros.
ATTORNEYS.

UNITED STATES PATENT OFFICE.

JOHN O. FRYER, OF CHELSEA, MASSACHUSETTS.

JACQUARD LOOM.

SPECIFICATION forming part of Reissued Letters Patent No. 10,379, dated September 11, 1883

Original No. 257,689, dated May 9, 1882. Application for reissue filed June 6, 1883.

*To all whom it may concern:*

Be it known that I, JOHN O. FRYER, a citizen of the United States, now residing at Chelsea, county of Suffolk, and State of Massachusetts, have invented certain new and useful Improvements in Jacquard Looms, of which the following is a specification.

My invention consists in the combination of the pattern-hooks with the prism, the stop and mechanism for giving to said prism and stop a reciprocating motion for the purpose of raising all said hooks by said prism and stop; also, in the combination of the prism, pattern-card, hooks, stop, and mechanism for giving to said prism, card, and stop a reciprocating motion at every other pick of the loom with the upper shuttle, and mechanism for throwing the same at every other pick to form a shed for the upper shuttle; also, in the combination of the prism, pattern-card, hooks, stop, and mechanism for giving to said prism, card, and stop a reciprocating motion at every other pick of the loom with the upper shuttle, and mechanism for throwing the same at every other pick, and the lower shuttle and mechanism for throwing the same at every other pick, and harnesses and mechanism for operating them to form a fabric with a figured face; also, in the combination, with mechanism for operating the harnesses to form alternately a double shed and a single shed, of the upper shuttle and mechanism for operating said shuttle at every other pick of the loom, and of the lower shuttle and mechanism for operating said lower shuttle at every pick of the loom, all substantially as hereinafter fully described.

In the accompanying drawings on three sheets, Figure 1 is an oblique view of the Jacquard mechanism in connection with a loom, the jacquard being secured to the under side of the floor-timbers of the room above said loom. Fig. 2 is a detached view of the cam-shaft, with the cams which give motion to the shuttles, and two harness-cams, such as operate the harnesses. Fig. 3 is a detached front view of a portion of the batten-racks which operate the shuttles, with the shuttles in section to show the racks on the shuttle and the pinions. Fig. 4 is a detached view of two harnesses, with draw-wires, jacks, treadles, and cam-shaft with harness-cams. Fig. 5 is a side elevation of the Jacquard mechanism representing the side which is toward the right-hand end of Fig. 1. Fig. 6 is a vertical cross-section of the Jacquard mechanism, taken just back of the front end of the frame. Fig. 7 is an elevation of the front end of the Jacquard mechanism and frame. Figs. 8 and 9 represent vertical cross-sections of the breast-beam, batten, and harness-frames, and show also a warp-beam, a pattern-prism, reed, guide-board, stop, and two hooks, the parts above the dotted line in each of said figures standing at right angles to their true position, in order to show them clearly, the prism being up in Fig. 8 and down in Fig. 9, these figures illustrating how the silk-thread of the upper shuttle is introduced into the fabric and allowed to float on the surface of the fabric to form a silk face for the same. Fig. 10 represents the face of a fabric such as may be made by means of the loom and jacquard herein described, the heavy black central portions representing the figure made by the thread of the upper shuttle.

A is the frame of the jacquard. The prism B, instead of being swung in and out against needles which push the hooks out of range of the rising griff, takes the place of the griff, which I dispense with, at least in one view of the matter, and itself rises and falls, being carried up at one pick and down at the next, herein differing from the griff in common use, which rises and falls at each pick. In other words, my prism serves for both prism and griff, it carrying pattern-cards C of the ordinary construction, and rising and falling like a griff. The prism is provided at one end with a ratchet-wheel, D, having as many teeth as there are faces of the prism, and at each fall of the prism the ratchet strikes a pawl, E, revolving the prism one face at a time, the prism being so placed that one face is horizontally at the top, except when the prism is turning. The crank-shaft F turns once in every pick, and a gear, F,′ on the crank-shaft has half as many teeth as the gear G, turning on a stud fixed on the loom end or frame. A lever, G′, just like the one commonly used to raise and lower the griff, raises the slides B′, in which the prism turns, and a connecting-rod, G², like that which usually operates the griff-lever, connects the end of the lever G′ with a crankpin on the gear G. The hooks H stand vertically, and to their lower ends are attached the cords H′, which lift the healds or heddles and raise the threads which form the figure, in the usual manner. The upper ends of the hooks H are turned down above the prism B, so that when the prism rises said upper ends enter the holes in the pattern-cards C, or are raised by being struck by the card, where the same is unperforated, and so raise the cords, healds, and figure-threads. The hooks are kept in place and are directed by passing through holes in the reed V and guide-board W, respectively.

The reed V is stationary and secured to the Jacquard frame, and is provided with two holes, X, for each hook, Fig. 6, while the guide-board W is provided with one set of holes X′, through which the bent ends of the hooks run, and rises and falls with the two hooks nearest the ends, the prism being secured to these two hooks, which never enter the pattern-cards, by the nuts Y on said hooks above and below the guide-board. The guide-board, being secured to the ends of the outer hooks, is of course at the ends of the other hooks when the prism is down, and, in conjunction with the reed V, guides the ends of the hooks to the proper parts of the pattern-card, and keeps said hooks at their proper distances from each other. The reed V acts as a stop and support for the hooks when the prism is down, the horizontal upper parts of the hooks at such times resting upon said reed.

It will be seen that I dispense with the needles commonly used in a Jacquard mechanism, the bent ends of the hooks H entering the cards vertically, similarly as the needles enter the cards horizontally, and that whereas the needles and cards of an ordinary jacquard merely throw such of the hooks as are not to be lifted out of the path of the rising griff, the cards in this machine lift the hooks by the upper ends of said hooks.

With my machine, so far as the same has been above described, the same results that are produced with the ordinary jacquard can be effected if the prism be made to rise and fall at every pick; but whereas only a part of the hooks are lifted by the griff of an ordinary jacquard when said griff rises once, I lift all the hooks whenever my prism rises, a part of said hooks being raised by the pattern-cards, as already explained, and the remainder of said hooks by a stop, I′, which rises and falls with the prism B, and is parallel with the prism. Said stop is placed below the top pattern-card C, directly under the hooks H, at a distance equal to the opening of the shed of the figure-threads, and strikes the be ends of the hooks not already raised by said cards.

In Fig. 6 the part of the prism-shaft I which lies between the ends of the prism serves as the stop I′; but it is evident that if the diameter of the prism were less than the opening of the figure-shed it would be necessary to place the stop below the prism and to support the prism by its ends or heads—that is, to break away so much of the prism-shaft as is within the prism, or else to have the prism turn on a stationary shaft, slotted or perforated vertically to admit the ends of the hooks, and to place immediately below the prism a horizontal piece supported by the slides which carry the prism, as in Figs. 8 and 9. When the prism, and, consequently, all the hooks, are down, the figure-threads all lie in the same plane below the lower, K′, of the two shuttles, as in Fig. 9; but when the hooks are raised, (a part of them to a greater height than the rest, as described,) the figure-threads form a shed for the upper shuttle, K, while the warp-threads, which belong to the body of the fabric, form a shed for the lower shuttle, K′, as in Fig. 8. The means for shedding the warps which form the body of the fabric are of well-known construction, and consist of harnesses $D^3$, Figs. 8 and 9, through which said warps pass, operated, as shown in Fig. 4, by draw-wires $D′ D^2$, attached to the frames E of said harnesses, upper and lower jacks or pivoted levers, J J′, treadles $L^2$, and cams $L^1$, secured to the cam-shaft S, said shaft S being provided with a gear, S′, which takes into a gear, $F^2$, on the main or crank shaft F, as shown in Fig. 1, all of the parts forming the shedding mechanism being operated in the usual way. A part of the harnesses, if operated by larger cams, might form the shed for the upper shuttle. The motion of the shuttles K K′ is peculiar. The upper shuttle, K, is thrown at every other pick, and the lower shuttle, K′, at every pick, so that on one pick the shuttles move together, say, to the right. On the next pick the lower shuttle alone moves to the left. On the third pick the shuttles pass each other in opposite directions, the lower one moving to the right, and on the fourth pick the lower shuttle alone moves to the left, and the same motions are then repeated. These motions are accomplished in narrow-ware looms as follows: Each shuttle is provided with a rack, L L′, into which pinions M M′, secured to the rails of the batten N, take, the pinions being turned by sliding racks O O′ in the usual manner. The sliding racks O O′ of the batten N are reciprocated by straps P P′, attached to the ends of the racks and passing over pulleys Q Q′, and connecting said racks with the treadles T T′. These treadles are thrown down by cams R R′ on the cam-shaft S, and are raised by the straps—that is, when the treadle at one end of the rack goes down, it draws the rack endwise, and by means of the strap at the other end of the same rack lifts the corresponding treadle, attached to said last-named strap. The particular cam-shaft S here shown revolves once in four picks, and has at the right-hand end two cams, R R′, one of which, R, operates the treadle T of the upper rack, O, and is of the shape shown, being in principle, however, a radial arm, with its outer end rounded off to lessen friction on the treadle T. The other cam, R′, on the same end of the cam-shaft, which cam operates the treadle T′ of the lower rack, O′, is double—that is, extends both ways radially from said shaft and parallel with the cam R. Now, at the left-hand end of the shaft the corresponding cams, R R′, are of the same shape as those already described, the single cam R being parallel to the other single cam R, but extending in the opposite direction from the cam-shaft, while the other double cam R′ is at right angles to the first double cam R′. The parts are so arranged that both shuttles move only when the prism is rising and up, and that when the prism is falling or down the lower shuttle only is thrown.

In weaving goods of the class for which this loom is specially adapted—that is, silk-faced goods—the body of the goods being of cotton or other material, it is common to have a rising and falling batten—that is, a batten which rises to put the filling of the lower shuttle into the body of the fabric, and falls to allow the upper shuttle to pass under the figure-threads which are raised by the hooks. Where the batten so rises and falls it is necessary that only one of the shuttles should be thrown at a time, because there is only one shed; but in my loom, owing to the fact that all the hooks are lifted, there are two sheds at every other pick, the lower shed being formed of the warps which make the body of the fabric, a few of the silk or figure threads being also in the top of the lower shed, and the upper shed consisting of the top of the lower shed and the remainder of the figure-threads, the latter forming the top of the upper shed. Now, in such a loom having a rising and falling batten the upper shuttle moves every third pick, so that the lower shuttle must stand still every third pick, and consequently such a loom will weave only two-thirds as fast as mine if both are run at the same rate of speed; but the rising and falling of the batten necessarily make the loom move more slowly, so that I gain here in speed.

Having thus described my invention, what I claim, and desire to secure by Letters Patent, is—

1. The combination of the hooks H with the prism B, the stop I′, and mechanism for giving to said prism and stop a reciprocating motion, as and for the purpose specified.

2. The combination of the prism B, pattern-card C, hooks H, stop I′, and mechanism for giving to said prism, card, and stop a reciprocating motion at every other pick of the loom, with the upper shuttle, K, and mechanism for throwing the same at every other pick, as and for the purpose specified.

3. The combination of the prism B, pattern-card C, hooks H, stop I′, and mechanism for giving to said prism, card, and stop a reciprocating motion at every other pick of the loom, with the upper shuttle, K, and mechanism for throwing the same at every other pick, and the lower shuttle, K′, and mechanism for throwing the same at every pick, and harnesses D, and mechanism for operating them, as and for the purpose specified.

4. The combination, with shedding mechanism for forming alternately a double shed and a single shed, of the upper shuttle and mechanism for throwing said shuttle at every other pick of the loom, and the lower shuttle and mechanism for throwing said lower shuttle at every pick of the loom.

JOHN O. FRYER.

Witnesses:
EDWIN W. BROWN,
WM. S. BELLOWS.